(12) United States Patent
Li et al.

(10) Patent No.: US 11,140,557 B2
(45) Date of Patent: Oct. 5, 2021

(54) METHOD AND APPARATUS FOR FACILITATING DATA TRANSMISSION

(71) Applicant: Telefonaktiebolaget LM Ericsson (publ), Stockholm (SE)

(72) Inventors: Ming Li, Beijing (CN); Yanqiang Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/347,864

(22) PCT Filed: Nov. 11, 2016

(86) PCT No.: PCT/CN2016/105411
§ 371 (c)(1),
(2) Date: May 7, 2019

(87) PCT Pub. No.: WO2018/086051
PCT Pub. Date: May 17, 2018

(65) Prior Publication Data
US 2019/0281470 A1    Sep. 12, 2019

(51) Int. Cl.
*H04W 16/14*    (2009.01)
*H04W 56/00*    (2009.01)
(Continued)

(52) U.S. Cl.
CPC ....... *H04W 16/14* (2013.01); *H04W 56/0045* (2013.01); *H04W 72/0446* (2013.01);
(Continued)

(58) Field of Classification Search
CPC .. H04L 5/0007; H04W 16/14; H04W 56/001; H04W 56/0045; H04W 72/0446; H04W 74/0808; H04W 84/12
See application file for complete search history.

(56) References Cited

U.S. PATENT DOCUMENTS 9,717,071 B2 * 7/2017 Chen ................. H04W 72/1215
9,883,404 B2 * 1/2018 Malladi ................. H04W 16/14
(Continued)

FOREIGN PATENT DOCUMENTS

CN    104717687 A    6/2015
CN    105578610 A    5/2016
(Continued)

OTHER PUBLICATIONS

Extended European Search Report issued in corresponding EP Application No. 16921125.7 dated Jul. 21, 2020, 6 Pages.
(Continued)

*Primary Examiner* — Alpus Hsu
(74) *Attorney, Agent, or Firm* — Sage Patent Group

(57) ABSTRACT

A method performed by a first wireless communication system operating on a first subframe structure in an unlicensed spectrum is disclosed. The method comprises determining a subframe timing difference between the first wireless communication system and a second wireless communication system operating on a second subframe structure in the unlicensed spectrum and determining whether timing difference exists between the first and second wireless communication systems based on the subframe timing difference. The method further comprises adjusting a subframe timing of the first wireless communication system, in response to determining the existence of the timing difference, to obtain a channel on an unlicensed carrier in the unlicensed spectrum for data communication by the first wireless communication system.

13 Claims, 9 Drawing Sheets

(51) Int. Cl.
*H04W 72/04* (2009.01)
*H04W 74/08* (2009.01)
*H04L 5/00* (2006.01)
*H04W 84/12* (2009.01)

(52) U.S. Cl.
CPC ....... *H04W 74/0808* (2013.01); *H04L 5/0007* (2013.01); *H04W 84/12* (2013.01)

(56) References Cited

U.S. PATENT DOCUMENTS

| | | | |
|---|---|---|---|
| 10,091,114 B2* | 10/2018 | Chai | H04L 47/24 |
| 2015/0103782 A1* | 4/2015 | Xu | H04W 16/14 370/329 |
| 2016/0309512 A1 | 10/2016 | Li et al. | |
| 2017/0048791 A1* | 2/2017 | Choi | H04W 48/18 |
| 2017/0085326 A1* | 3/2017 | Li | H04B 17/345 |
| 2017/0094546 A1* | 3/2017 | Chai | H04W 72/0446 |
| 2017/0142743 A1* | 5/2017 | Yoon | H04W 56/00 |
| 2018/0103458 A1* | 4/2018 | Tooher | H04W 72/042 |
| 2018/0199353 A1* | 7/2018 | Ahn | H04W 74/08 |
| 2018/0352573 A1* | 12/2018 | Yang | H04W 76/27 |
| 2019/0053222 A1* | 2/2019 | Bhorkar | H04W 16/14 |
| 2019/0141696 A1* | 5/2019 | Kim | H04L 5/0055 |
| 2019/0200391 A1* | 6/2019 | Li | H04W 16/14 |

FOREIGN PATENT DOCUMENTS

| | | |
|---|---|---|
| CN | 105992346 A | 10/2016 |
| CN | 105992384 A | 10/2016 |
| EP | 3018938 A1 | 5/2016 |
| WO | 2016169399 A1 | 10/2016 |

OTHER PUBLICATIONS

3GPP; "LTE; Evolved Universal Terrestrial Radio Access (E-UTRA); Physical layer procedures", 3GPP TS 36.213 version 12.8.0 Release 12, May 2016.

* cited by examiner (a)

(b)

METHOD AND APPARATUS FOR FACILITATING DATA TRANSMISSION

CROSS-REFERENCE TO RELATED APPLICATION

The present application is a U.S. National Stage Entry of PCT International Application No. PCT/CN2016/105411, filed on Nov. 11, 2016, the disclosure and content of which is incorporated herein by reference in its entirety.

TECHNICAL FIELD

The non-limiting and exemplary embodiments of the present disclosure generally relate to the field of wireless communications, and specifically to a method, an apparatus, and a computer program for facilitating data transmission on an unlicensed carrier with coexistence of different wireless communication systems operating respectively on a subframe structure in an unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

With standardization and further enhancement of the Licensed Assisted Access-Long Term Evolution (LAA-LTE) in Third Generation Partnership Project (3GPP), LTE over Unlicensed Carriers in Stand Alone mode (which will be referred to as 'standalone unlicensed LTE' hereafter) has attracted an intense interest from main system infrastructure vendors.

In LAA-LTE, a wireless communication network is operated with carrier aggregation (CA). Both licensed component carriers (CCs) and unlicensed CCs are aggregated. A primary component carrier (PCC) is a licensed carrier, while the unlicensed CCs can only be configured as secondary CCs (SCCs). The primary CC (PCC) is usually responsible for Radio Resource Management (RRM) and mobility management etc. Configuration, activation and de-activation of the unlicensed CCs follow a typical procedure for CA as defined in 3GPP TS 36.331 V10.12.0. FIG. 1(a) shows an example of carrier aggregation in LAA-LTE. At least one licensed CC is configured as the primary CC in downlink (DL), while at least one licensed CC is configured as the primary CC in uplink (UL). Meanwhile, there is one or more unlicensed CCs in DL, or in UL, or in both DL and UL.

In standalone unlicensed LTE, there is no licensed CC to be used as the primary CC. That is, control functionalities that are managed on the licensed CC in an LAA-LTE system will be provided via unlicensed CCs in a standalone unlicensed LTE. Due to availability of unlicensed CCs is opportunistic, control signals and related procedures need to be modified with regard to the restriction of channel availability. FIG. 1(b) shows an example of carrier aggregation in standalone unlicensed LTE. As shown, PCC and all SCCs are configured on unlicensed carriers in both DL and UL.

The Listen Before Talk (LBT) scheme is originally used in Wi-Fi systems, which are defined as wireless local area network (WLAN) products based on Institute of Electrical and Electronics Engineers (IEEE) 802.11 standards.

According to IEEE 802.11 standards, the basic media access control (MAC) protocol employs a Carrier Sense Multiple Access with Collision Avoidance (CSMA/CA)-based LBT mechanism. FIG. 2 illustrates the LBT scheme used in current Wi-Fi systems. As illustrated, the same protocol is applied by all stations in both DL and UL. A station, e.g. a user equipment (UE) that wishes to transmit a packet first senses the medium. If the medium is sensed idle for a certain time (the so-called Distributed Inter Frame Space (DIFS), e.g. 50 μs for 802.11b), the packet is then transmitted. If the medium is busy, the station defers until the medium is sensed idle. When this occurs, the station does not transmit immediately, since it may lead to collisions if more than one station was deferring. Instead, the station sets a backoff timer or counter to a random value, and does not transmit until this timer has expired or this counter has been decreased to 0. The backoff timer or counter is only decreased when the medium is sensed idle. Whenever the medium is sensed busy, a deferment state is entered where the backoff timer or counter is not decreased. When the backoff timer expires or the counter is decreased to 0, the packet will be transmitted. If the packet is successfully received by a receiving station, it responds with an acknowledgement to the transmitting station. The acknowledgement is sent a Short Inter Frame Space (SIFS), e.g. 10 μs for 802.11b, after the packet is received. Since SIFS<DIFS, no other station will access the medium during this time. If no acknowledgement is received by the transmitting station, because either the packet itself or the acknowledgement was lost, the transmitting station generates a new backoff timer or counter, and retransmits the packet when the backoff timer has expired or the counter has been decreased to 0. Even if the packet was successfully acknowledged, the transmitter will generate a backoff and wait for it to expire or reach 0 before transmitting the next packet.

In LTE, particularly in LAA-LTE or in standalone unlicensed LTE, LBT is mandatory before data transmission on unlicensed carriers. According to the current standardization, e.g. as described in 3GPP TS 36.213 V12.8.0, data transmission can be started at the beginning of each slot of a subframe, which will be referred to as a "transmission opportunity" in this document. For example, if a subframe has 14 Orthogonal Frequency Division Multiplexing (OFDM) symbols, then the data transmission opportunity may start from OFDM symbol 0 or OFDM 7. Generally, the LBT may take 1 to 3 OFDM symbols. Thus, the LBT needs to be performed 1~3 OFDM symbols before the end of each slot of a subframe, which may be simplified as the LBT needs to be performed at the end of the subframe or in the middle of the subframe.

Usually, channel availability can be determined based on the energy collected over a target channel on an unlicensed carrier. If the collected energy is lower than a predefined threshold (e.g. −62 dBm), the target channel may be determined to be available. If LBT for a channel on an unlicensed carrier is performed at the end of a subframe and a channel is determined to be available, then data transmission can be started from the first symbol of the next subframe. Likewise, if LBT for a channel on an unlicensed carrier is performed in the middle of a subframe and a channel is determined to be available, then data transmission can be started from the first symbol of the second slot of the subframe.

For more efficient utilization of radio resources, coexistence of different radio systems operating over a same spectrum cannot be avoided. Various researches and tests have been carried out to ensure a harmonious coexistence between LAA-LTE and WiFi over a same unlicensed spectrum. It has been concluded that LAA-LTE and WiFi can coexist over the same spectrum with the adopted LBT scheme in LAA-LTE.

However, there is a lack of research regarding coexistence between different LTE systems operable on unlicensed carriers. Since such LTE systems operate on a subframe structure, transmission opportunities are limited by the subframe structure as described above. Furthermore, a subframe length in these LTE systems is much longer compared to WiFi systems. Therefore, there may be a fairness problem, as shown in FIG. 3, between coexisting LTE systems operable on unlicensed carriers, when there is a timing difference between the two LTE systems. As shown, the subframe timing of System 1 is ahead of the subframe timing of System 2. Thus, System 1 may always finish its LBT earlier than System 2 when the channel is idle, which means that System 1 has a higher probability to access the channel Especially, in the case of a high traffic load (e.g. at a rush hour for a mobility network), System 1 can triumph System 2 to transmit data due to the higher probability to access the channel, which means obvious unfairness between the two systems.

SUMMARY

Various embodiments of the present disclosure mainly aim at providing a solution for facilitating data transmission on an unlicensed carrier by a wireless communication system operating on a subframe structure in an unlicensed spectrum, when there are more than one such wireless communication systems, like LAA-LTE and standalone unlicensed LTE systems, coexist. Other features and advantages of embodiments of the present disclosure will also be understood from the following description of specific embodiments when read in conjunction with the companying drawings, which illustrate the principles of embodiments of the present disclosure.

In a first aspect of the present disclosure, there is provided a method for facilitating data transmission on an unlicensed carrier by a first wireless communication system operating on a first subframe structure in an unlicensed spectrum. The method comprises obtaining a subframe timing difference between the first wireless communication system and a second wireless communication system operating on a second subframe structure in the unlicensed spectrum and determining whether unfairness exists between the first and second wireless communication systems based on the subframe timing difference. The method also comprises adjusting a subframe timing of the first wireless system, in response to the determination of the existence of unfairness, so that a probability to obtain a channel on an unlicensed carrier in the unlicensed spectrum for data communication by the first wireless communication system is improved.

In an embodiment, the subframe timing may be adjusted so that the subframe timing difference is increased to be larger than a maximum contention window of the first wireless communication system.

In another embodiment, the subframe timing may be adjusted so that the subframe timing difference is increased to a half of a subframe length of the second subframe structure.

In yet another embodiment, the subframe timing may be adjusted so that the subframe timings of the first and second wireless communication systems are aligned.

In a further embodiment, the first wireless communication system may determine the subframe timing of the second wireless communication system based on energy detection or reference signal detection of the second wireless communication system and then obtain the subframe timing difference based on the determined subframe timing.

In yet another embodiment, the first wireless communication system may obtain the subframe timing difference based on a report received from a terminal device served by the first wireless communication system.

In a second aspect of the present disclosure, there is provided an apparatus implemented in a first wireless communication system operating on a first subframe structure in an unlicensed spectrum. The apparatus comprises a processor and a memory. The memory contains instructions executable by the processor whereby the apparatus is operative to obtain a subframe timing difference between the first wireless communication system and a second wireless communication system operating on a second subframe structure in the unlicensed spectrum, determine whether unfairness exists between the first and second wireless communication systems based on the subframe timing difference and to adjust a subframe timing of the first wireless system, in response to the determination of the existence of unfairness, so that a probability to obtain a channel on an unlicensed carrier in the unlicensed spectrum for data communication by the first wireless communication system is improved.

In a third aspect of the present disclosure, there is provided an apparatus implemented in a first wireless communication system operating on a first subframe structure in an unlicensed spectrum. The apparatus comprises an obtaining unit, a determining unit and an adjusting unit. The obtaining unit is configured to obtain a subframe timing difference between the first wireless communication system and a second wireless communication system operating on a second subframe structure in the unlicensed spectrum. The determining unit is configured to determine whether unfairness exists between the first and second wireless communication systems based on the subframe timing difference. The adjusting unit is configured to adjust a subframe timing of the first wireless system, in response to the determination of the existence of unfairness, so that a probability to obtain a channel on an unlicensed carrier in the unlicensed spectrum for data communication by the first wireless communication system is improved.

In a fourth aspect of the present disclosure, there is provided a computer program. The computer program comprises instructions which, when executed on at least one processor, cause the at least one processor to carry out the method according to the first aspect of the present disclosure.

It should be appreciated that, corresponding embodiments of the first aspect are also applicable to the second, third, and fourth aspects.

With particular embodiments and aspects as described above and in the following, a wireless communication system can at least obtain a relatively equal opportunity to access a channel on an unlicensed carrier when coexisting with another wireless communication system, both of which are operating respectively on a subframe structure in an unlicensed spectrum, by adjusting its own subframe timing based on a subframe timing difference between the two wireless communication systems. In other words, the probability for the wireless communication system to access a channel on an unlicensed carrier is improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Figure 1:
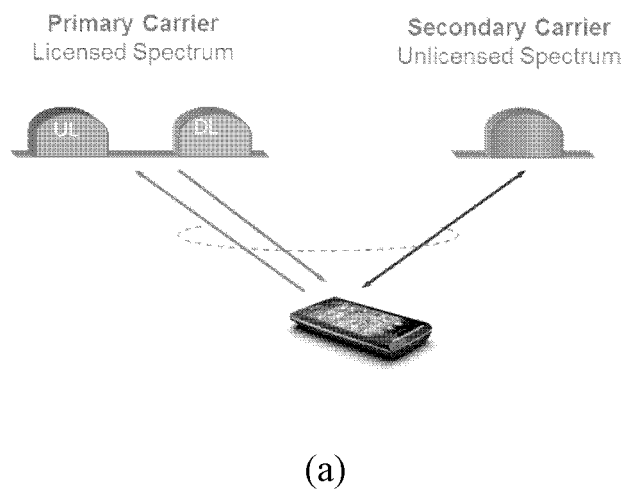
FIG. 1(a) shows an example of carrier aggregation in LAA-LTE and FIG. 1(b) shows an example of carrier aggregation in standalone unlicensed LTE.
Figure 1:
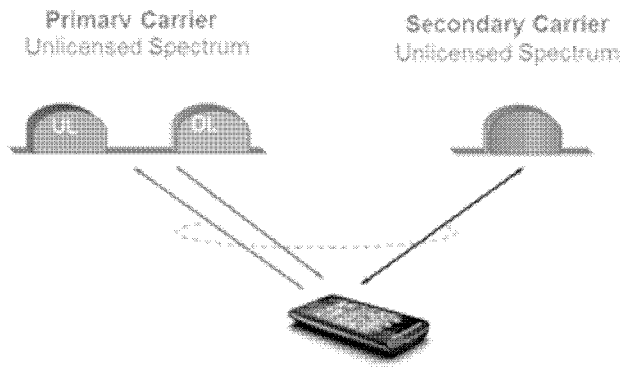
Figure 2:
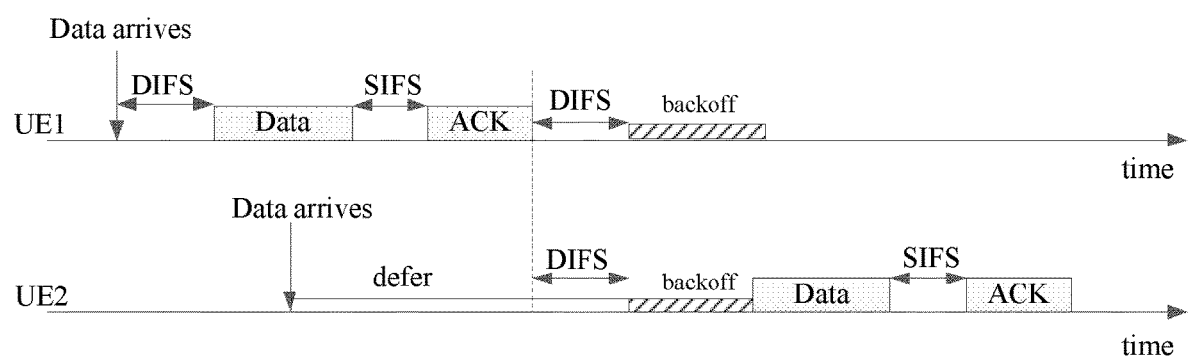
FIG. 2 illustrates the LBT scheme used in current Wi-Fi systems.

Hereinafter, the principle and spirit of the present disclosure will be described with reference to illustrative embodiments. It should be understood, all these embodiments are given merely for one skilled in the art to better understand and further implement the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may refer to e.g. gNB, eNB, eNodeB, NodeB or base transceiver station (BTS) etc. depending on the technology and terminology to be used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. The term "wireless communication system" used herein may refer to a wireless communication system operable in an unlicensed spectrum and operating with a subframe structure, which may include but not limited to LAA LTE systems, standalone unlicensed LTE systems, LAA-New Radio (NR) systems and standalone unlicensed NR systems, for example.

Figure 3:
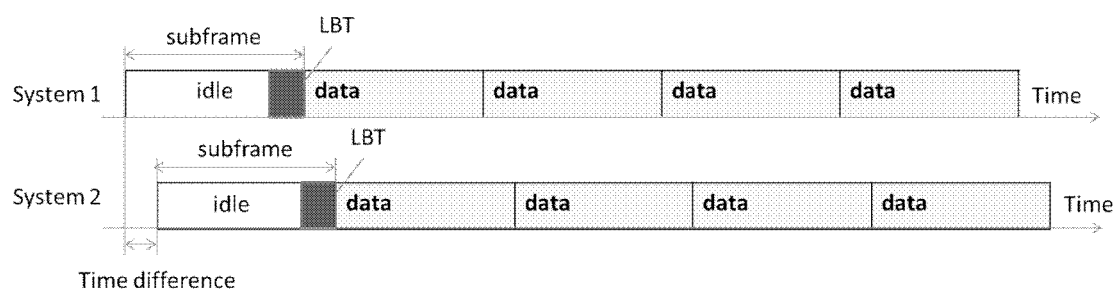
FIG. 3 shows a fairness problem between coexisting LTE systems operable on unlicensed carriers.

As described in the Background with reference to FIG. 3, when two wireless communication systems operating on a subframe structure in an unlicensed spectrum coexist, there might be unfairness to access a channel on a same unlicensed carrier, if there is a subframe timing difference between the two coexisting wireless communication systems. More specifically, for System 2 as shown in FIG. 3, only when its subframe timing is behind System 1 by more than a maximum contention window (which may also be called 'back-off window', for example in Institute of Electrical and Electronics Engineers (IEEE)) of the System 2, System 2 will suffer the unfairness, particularly for high traffic load scenarios. For LAA-LTE, a definition of the maximum contention window may be found in 3GPP TS 36.213 V12.8.0. In general, the maximum contention window limits a longest time of a backoff timer or a maximum number of a backoff counter used for LBT.

In order to at least improve a probability of a wireless communication system possibly suffering from unfairness to obtain a channel on an unlicensed carrier, when more than one such wireless communication systems coexist, various embodiments of the present disclosure provide a solution to facilitate data transmission of that wireless communication system on the unlicensed carrier.

Figure 4:
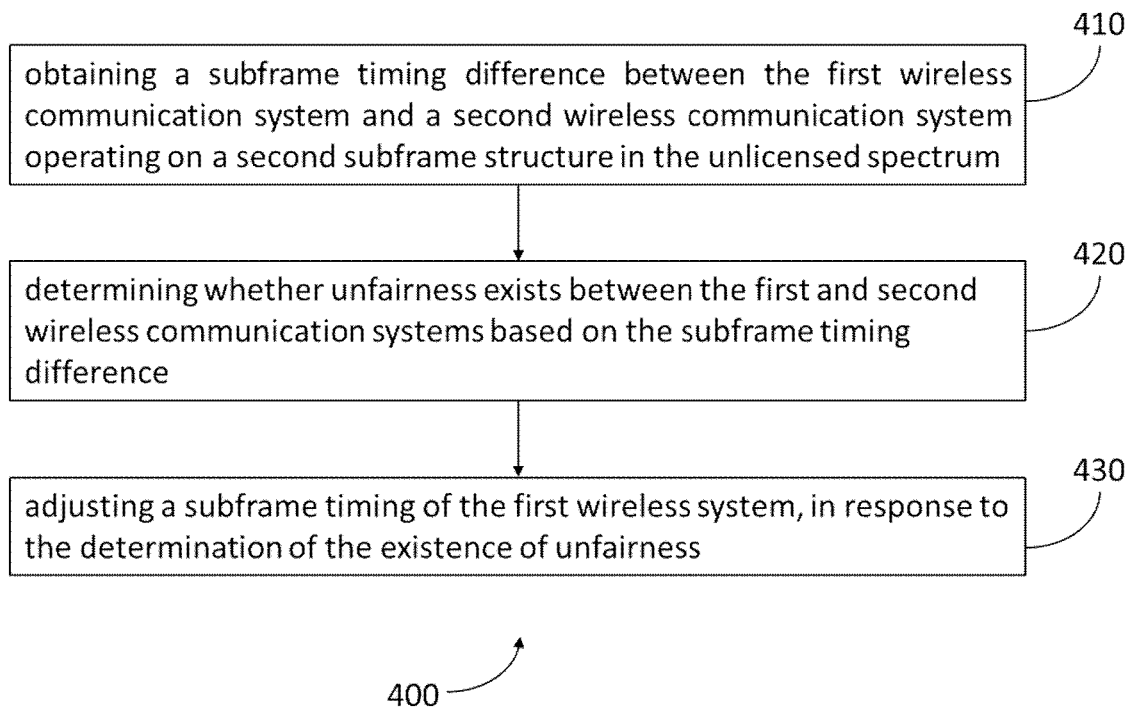
FIG. 4 illustrates a flowchart of a method for facilitating data transmission of a wireless communication system on an unlicensed carrier according to an embodiment of the present disclosure.

FIG. 4 illustrates a flowchart of a method 400 for facilitating data transmission of a wireless communication system (which will be referred to as 'a first wireless communication system') operating on a first subframe structure in an unlicensed spectrum, e.g. an LAA-LTE system, a standalone unlicensed LTE system etc. according to an embodiment of the present disclosure. The method 400 is performed by the first wireless communication system, e.g. at a base station, such as an eNB in the LAA-LTE system.

As illustrated, the method 400 starts from block 410, in which the first communication system obtains a subframe timing difference between the first wireless communication system and a second wireless communication system, which operates on a second subframe structure in the unlicensed spectrum. The first and second wireless communication systems may be the same type of communication systems, e.g. both are LAA-LTE systems or standalone LTE systems. In such a case, the first subframe structure may be the same as the second subframe structure, for example each subframe is composed of two slots, each slot including 7 OFDM symbols.

Alternatively, the first and second wireless communication systems may be of different types. For example, the first wireless communication system may be an LAA-LTE system, while the second wireless communication system may be a standalone unlicensed NR system. In such a case, the first subframe structure may be different from the second subframe structure.

The subframe timing difference may be obtained as how much a transmission opportunity of the first wireless communication system is behind the closest transmission opportunity of the second wireless communication system. For example, as shown later in FIG. 5, if System 1 and System 2 are two coexisting LAA-LTE systems, the subframe timing difference obtained by System 2 is an absolute difference between the beginning of the first slot of a subframe, i.e. OFDM symbol 0, of System 2 and the beginning of the first slot of a subframe, i.e. OFDM symbol 0, of System 1.

The first wireless communication system usually monitors the subframe timing of the second wireless communication system so as to obtain the subframe timing difference in time.

In an embodiment, the first wireless communication system may determine the subframe timing of the second wireless communication system based on energy detection or reference signal detection of the second wireless communication system.

For example, the first wireless communication system may monitor the subframe timing of the second wireless communication system during its LBT process for a target channel on an unlicensed carrier based on energy detection on that target channel. When the first wireless communication system detects enough samples of the energy, it can determine the subframe timing of the second wireless communication system based on the detected energy samples and accordingly obtain the subframe timing difference between the two systems. How to determine the subframe timing based on the detected energy samples is well known to a person skilled in the art and thus will not be detailed herein.

For another example, if the first wireless communication system has a capability to detect reference signals, e.g. demodulation reference signal (DRS), Primary Synchronization Signal (PSS), Secondary Synchronization Signal (SSS), of the second wireless communication system, the first wireless communication system can determine the subframe timing of the second wireless communication system based on the detected reference signals and accordingly obtain the subframe timing difference between the two systems. How to determine the subframe timing based on the detected reference signals is well known to a person skilled in the art and thus will not be detailed herein.

In another embodiment, the first wireless communication system may obtain the subframe timing difference based on a report received from a terminal device served by the first wireless communication system.

For example, the terminal device may monitor the subframe timing of the second wireless communication system, e.g. by detecting a reference signal of the second wireless communication system, and then report the subframe timing to the first wireless communication system, particularly to the serving base station of the first wireless communication system, which may further obtain the subframe timing difference based on the reported subframe timing of the second wireless communication system. In addition, the terminal device may monitor the subframe timing of the first and second systems, then determine the subframe timing difference locally and then directly report the subframe timing difference to the first wireless communication system.

In various embodiments, the report from the terminal device may be event triggered. For example, the terminal device will report the subframe timing difference when the determined timing difference may result in a lower probability to access the target channel by the system which is currently serving the terminal device. Alternatively, or additionally, the report may be reported on-demand. For example, the terminal device may measure and report the subframe timing difference only when it is requested by its serving system.

By this way, the terminal device can utilize its measurement capability (e.g. multiple cell, multiple Radio Access Technology (RAT), or multiple carrier measurement capability) to quickly determine the subframe timing difference between coexisting wireless communication systems.

In yet another embodiment, both the first wireless communication system and the terminal device can respectively monitor the subframe timing of the second wireless communication system and then obtain the subframe timing difference. The first wireless communication system can make a determination of the subframe timing difference based on either self-collected information, or the reported information or on both as described above.

Now reference is made back to block 420 of FIG. 4, in which the first wireless communication system determines whether unfairness exists between the first and second wireless communication systems based on the subframe timing difference. For an instance of two coexisting LAA-LTE systems, if the subframe timing of the first wireless communication system is one OFDM symbol behind that of the second wireless communication system, possibly with a certain offset, it may result in that the LBT of the first wireless communication system is always later than the second wireless communication system statistically. Accordingly, it can be determined that there is unfairness for the two wireless communication systems to contend for a channel on an unlicensed carrier in the unlicensed spectrum, i.e. the first wireless communication system may have a lower probability to obtain and access the channel on the unlicensed carrier.

In an embodiment of a higher traffic load, when the obtained subframe timing difference is within the maximum contention window of the first system, i.e., the subframe timing of the first wireless communication system is behind the subframe timing of the second wireless communication by less than the length of the maximum contention window, it can be directly determined that unfairness exists.

In an embodiment of a lower traffic load, the first wireless communication system may further calculate a probability of failure in obtaining the channel on the unlicensed channel. When the probability is higher than a certain threshold, e.g. 60%, then the first wireless communication system may determine that unfairness exists.

At block 430, the first wireless communication system adjusts its subframe timing, in response to the determination of the existence of unfairness, so that a probability to obtain a channel for data communication by the first wireless communication system can be improved.

There are different methods to adjust the subframe timing.

Figure 5:
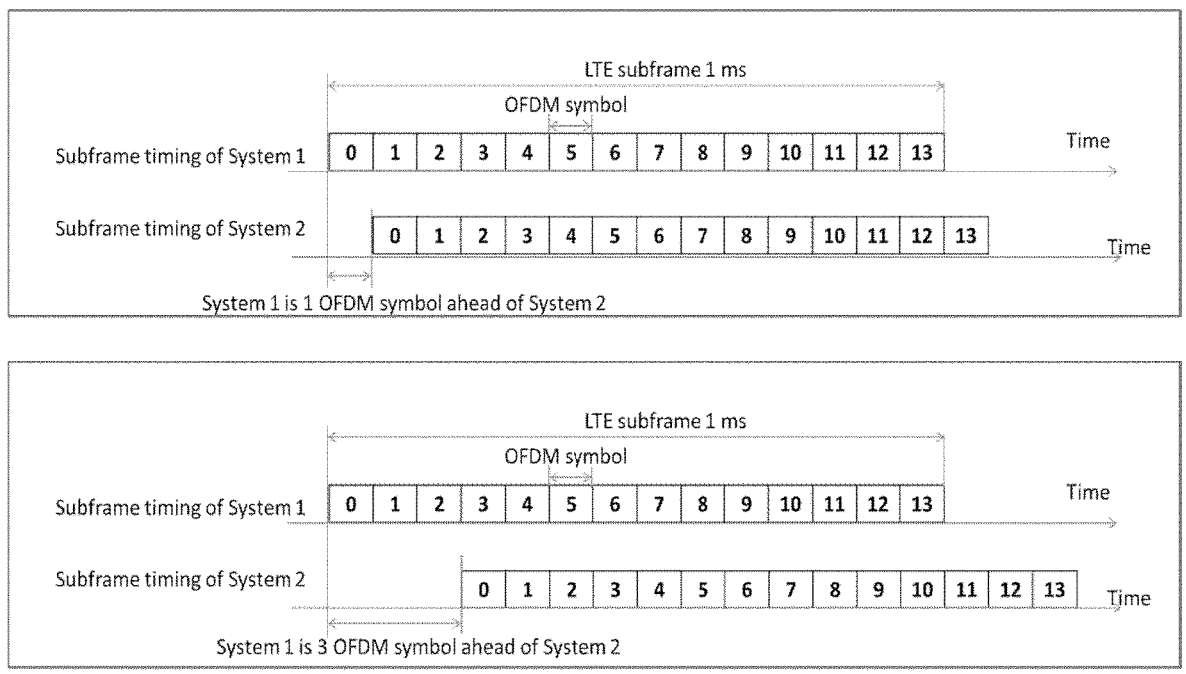
FIG. 5 illustrates an example of an embodiment where the subframe timing of a wireless communication system is adjusted so that the subframe timing difference between two coexisting wireless communication systems is increased to be larger than a maximum contention window of the wireless communication system.

In an embodiment, the first wireless communication system may adjust the subframe timing so as to increase the subframe timing difference to be larger than the maximum contention window of the first wireless communication system. FIG. 5 illustrates an example of this embodiment where two wireless communications systems are based on an LTE subframe structure. In the upper figure of FIG. 5, the subframe timing of System 1 (corresponding to the second wireless communication system) is one OFDM symbol ahead of that of System 2 (corresponding to the first wireless communication system), which results in that System 1 almost always (particularly with a higher traffic load) has a higher probability to contend for a channel on the unlicensed carrier. In the lower figure of FIG. 5, System 2 has adjusted its subframe timing so that the subframe timing difference between System 1 and System 2 is 3 OFDM symbols (~210 microseconds), which is larger than the maximum contention window. Due to the timing difference between the two systems being larger than the maximum contention window, the channel assessments of System 1 and 2 become independent. By this way, the first and second wireless communication systems may have a relatively equal opportunity to access the channel on the unlicensed carrier. In other words, the probability for the first wireless communication system to access the channel is improved.

Figure 6:
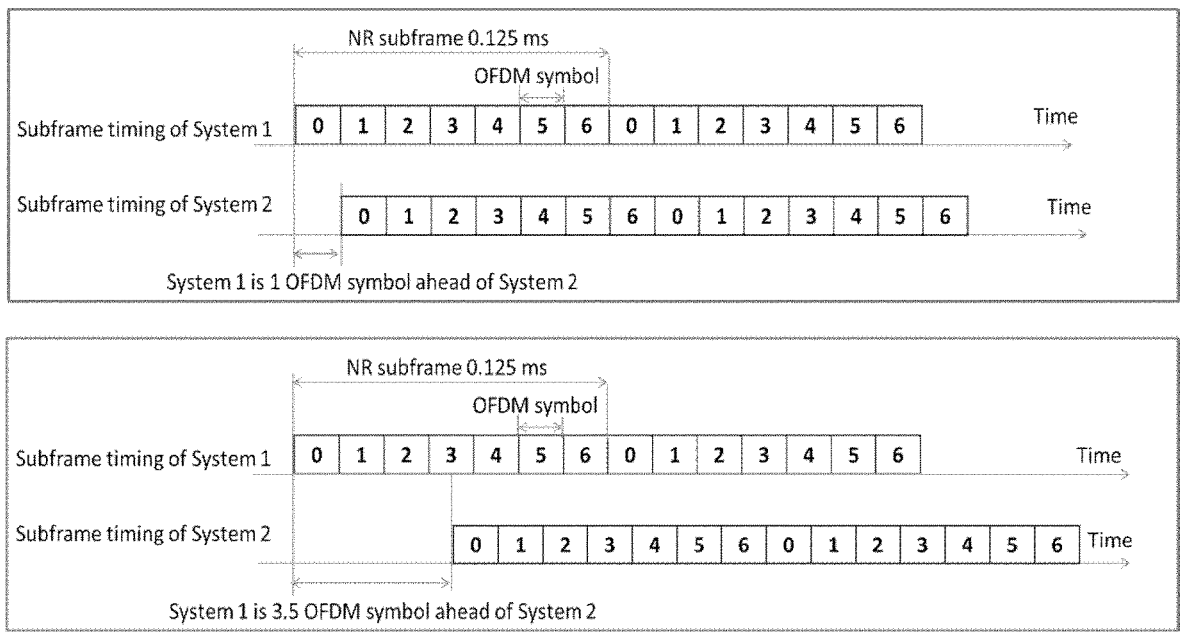
FIG. 6 illustrates an example of subframe timing adjustment in the case of a shorter subframe structure.

In another embodiment, the first wireless communication system may adjust its subframe timing so that the subframe timing difference can be increased to a half of a subframe length of the second subframe structure. This embodiment may be more applicable to wireless communication systems with a shorter subframe structure, e.g. NR systems, for which it may be impossible to adjust the subframe timing difference to be larger than the maximum contention window currently defined for LBT. By increasing the subframe timing difference to a half of the subframe length of the second subframe structure, the two systems may have a relatively equal opportunity to access the channel statistically on the unlicensed carrier. FIG. 6 illustrates an example of subframe timing adjustment in the case of a shorter subframe structure, e.g. in an NR system.

As illustrated, in the upper figure of FIG. 6, the subframe timing of System 1 (corresponding to the second wireless communication system) is one OFDM symbol ahead of that of System 2 (corresponding to the first wireless communication system), which results in that System 1 almost always (particularly with a higher traffic load) has a higher probability to contend for a channel on the unlicensed carrier. In the lower figure of FIG. 6, System 2 has adjusted its subframe timing so that the subframe timing difference is half of the subframe length, possibly with a certain offset. With the adjusted timing difference, the two systems will have a relatively equal opportunity to access the channel statistically on the unlicensed carrier. In other words, the probability for the first wireless communication system to access the channel is improved.

Figure 7:
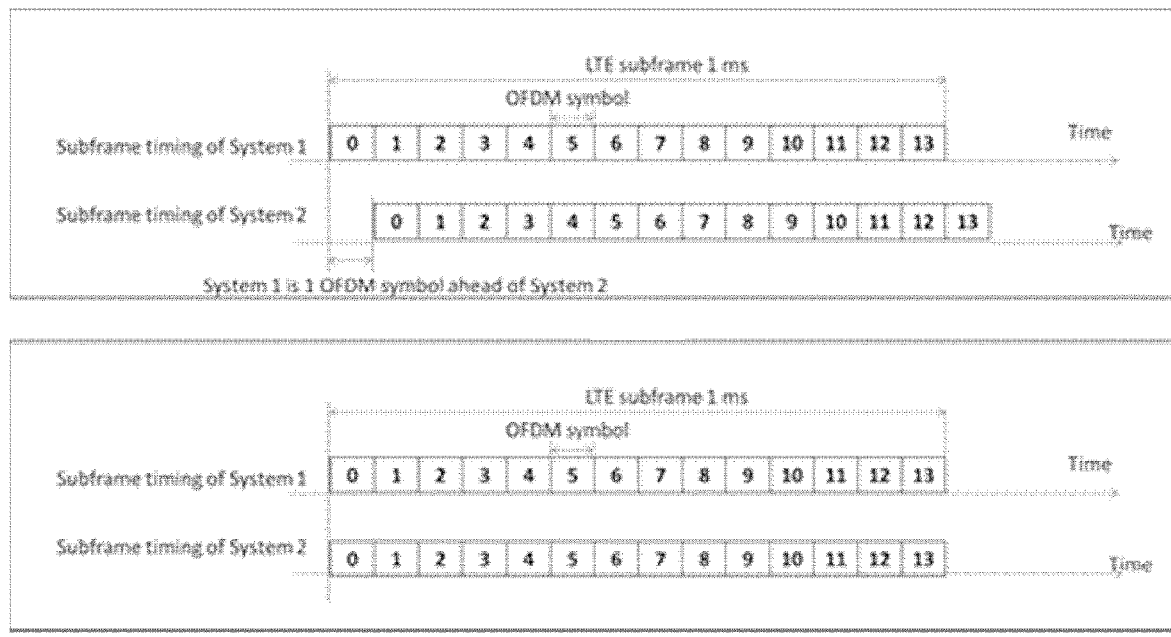
FIG. 7 illustrates an example of an embodiment where the subframe timing of a wireless communication system is adjusted so that the subframe timings of two coexisting wireless communication systems are aligned.

In yet another embodiment, the first wireless communication system may adjust the subframe timing so as to align the subframe timings of the first and second wireless communication systems. In this embodiment, a wireless communication system, which completes its LBT earlier, will acquire the channel Thus, the first and second wireless communication systems have a fairer opportunity to contend for and access the channel on the unlicensed carrier. FIG. 7 illustrates an example of this embodiment.

Figure 8:
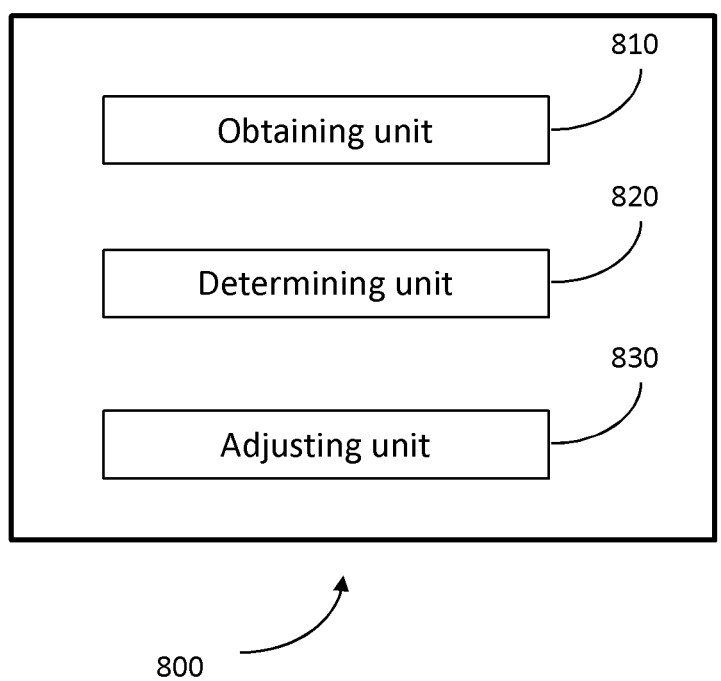
FIG. 8 illustrates a schematic block diagram of an apparatus for facilitating data transmission of a wireless communication system on an unlicensed carrier according to an embodiment of the present disclosure.

FIG. 8 illustrates a schematic block diagram of an apparatus 800 for facilitating data transmission on an unlicensed carrier by a wireless communication system (which will be referred to as 'a first wireless communication system' hereafter) operating on a subframe structure (which will be referred to as 'a first subframe structure' hereafter) in an unlicensed spectrum according to an embodiment of the present disclosure. The apparatus 800 may be implemented in the first wireless communication system and operable to perform the method 400 as described with reference to FIGS. 4-6 and possibly any other related processes or methods.

As illustrated in FIG. 8, the apparatus 800 includes an obtaining unit 810, a determining unit 820 and an adjusting unit 830.

The obtaining unit 810 is configured to obtain a subframe timing difference between the first wireless communication system and a second wireless communication system operating on a second subframe structure in the unlicensed spectrum. As discussed above with reference to FIG. 4, the first and second wireless communication systems may be of the same or different types. Correspondingly, the first and second subframe structures may be the same or different.

The determining unit 820 is configured to determine whether unfairness exists between the first and second wireless communication systems based on the subframe timing difference.

The adjusting unit 830 is configured to adjust a subframe timing of the first wireless system, in response to the determination of the existence of unfairness, so that a probability to obtain a channel on an unlicensed carrier in the unlicensed spectrum for data communication by the first wireless communication system is improved.

In an embodiment, the adjusting unit 830 may be further configured to adjust the subframe timing so that the subframe timing difference is increased to be larger than a maximum contention window of the first wireless communication system.

In another embodiment, the adjusting unit 830 may be further configured to adjust the subframe timing so that the subframe timing difference is increased to a half of a subframe length of the second subframe structure.

In yet another embodiment, the adjusting unit 830 may be further configured to adjust the subframe timing so that the first and second wireless communication systems are aligned.

In an embodiment, the determining unit 820 may be further configured to determine the subframe timing of the second wireless communication system based on energy detection or reference signal detection of the second wireless communication system and accordingly obtain the subframe timing difference.

In another embodiment, the first wireless communication system may be further configured to determine the subframe timing difference based on a report received from a terminal device served by the first wireless communication system.

The above units 810-830 can be configured to implement the corresponding operations or steps at blocks 410-430 as described with reference to FIGS. 4-6 and thus will not be detailed herein for brevity purpose.

Figure 9:
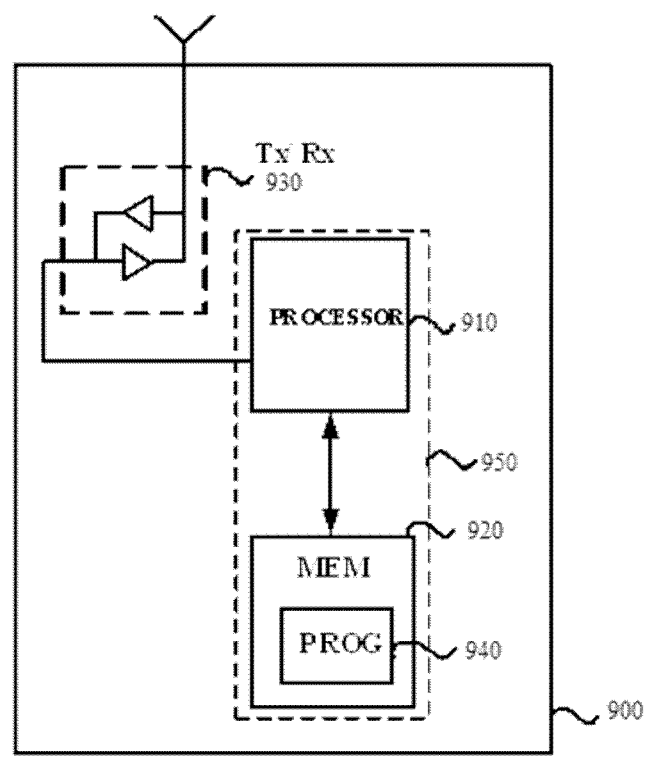
FIG. 9 illustrates another schematic block diagram of an apparatus for facilitating data transmission of a wireless communication system on an unlicensed according to an embodiment of the present disclosure.

FIG. 9 illustrates a schematic block diagram of an apparatus 900 adapted for facilitating data transmission on an unlicensed carrier by a wireless communication system operating on a subframe structure in an unlicensed spectrum according to an embodiment of the present disclosure. The apparatus 900 is implemented in the wireless communication system.

The apparatus 900 comprises at least one processor 910, such as a data processor (DP) and at least one memory (MEM) 920 coupled to the processor 910. The apparatus 900 may further comprise a transmitter TX and receiver RX 930 coupled to the processor 910 for establishing wireless communications, e.g. with terminal devices. The MEM 920 may be non-transitory machine/computer readable storage medium and stores a program (PROG) 940. The PROG 940 may include instructions that, when executed on the associated processor 910, enable the apparatus 900 to operate in accordance with the embodiments of the present disclosure, for example to perform the method 400 as described with reference to FIGS. 4-6. The PROG 940 may be embodied in a computer program product. A combination of the at least one processor 910 and the at least one MEM 920 may form processing means 950 adapted to implement some embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 910 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first wireless communication system operating on a first subframe structure in an unlicensed spectrum, the method comprising:
monitoring a subframe timing of a second wireless communication system operating on a second subframe structure in the unlicensed spectrum;
obtaining a subframe timing difference between the first wireless communication system and the second wireless communication system based on the subframe timing of the second wireless communication system;
determining whether unfairness exists between the first and second wireless communication systems based on the subframe timing difference, wherein the unfairness exists between the first and second wireless communication systems to contend for a channel on an unlicensed carrier in the unlicensed spectrum, causing the first wireless communication system to have a probability lower than the second wireless communication system to obtain the channel; and
adjusting a subframe timing of the first wireless communication system, in response to determining the existence of the unfairness, to improve the probability of the first wireless communication system to obtain the channel on the unlicensed carrier in the unlicensed spectrum for data communication by the first wireless communication system.

2. The method according to claim 1, wherein adjusting the subframe timing comprises:

adjusting the subframe timing by increasing the subframe timing difference to be larger than a maximum contention window of the first wireless communication system.

3. The method according to claim 1, wherein adjusting the subframe timing comprises:
adjusting the subframe timing by increasing the subframe timing difference to a half of a subframe length of the second subframe structure.

4. The method according to claim 1, wherein adjusting the subframe timing comprises:
aligning the subframe timing of the first wireless communication system and the subframe timing of the second wireless communication system.

5. The method according to claim 1, wherein obtaining the subframe timing difference comprises:
determining, by the first wireless communication system, the subframe timing of the second wireless communication system based on energy detection or reference signal detection of the second wireless communication system.

6. The method according to claim 1, wherein obtaining the subframe timing difference comprises:
obtaining the subframe timing difference based on a report received from a terminal device served by the first wireless communication system.

7. An apparatus implemented in a first wireless communication system operating on a first subframe structure in an unlicensed spectrum, the apparatus comprising:
a processor; and
a memory, said memory comprising instructions executable by said processor whereby said apparatus is operative to:
monitor a subframe timing of a second wireless communication system operating on a second subframe structure in the unlicensed spectrum;
obtain a subframe timing difference between the first wireless communication system and the second wireless communication system based on the subframe timing of the second wireless communication system;
determine whether unfairness exists between the first and second wireless communication systems based on the subframe timing difference, wherein the unfairness exists between the first and second wireless communication systems to contend for a channel on an unlicensed carrier in the unlicensed spectrum, causing the first wireless communication system to have a probability lower than the second wireless communication system to obtain the channel; and
adjust a subframe timing of the first wireless communication system, in response to the determination of the existence of the unfairness, to improve the probability of the first wireless communication system to obtain the channel on the unlicensed carrier in the unlicensed spectrum for data communication by the first wireless communication system.

8. The apparatus according to claim 7, wherein said memory further comprises instructions executable by said processor whereby said apparatus is operative to:
adjust the subframe timing by increasing the subframe timing difference to be larger than a maximum contention window of the first wireless communication system.

9. The apparatus according to claim 7, wherein said memory further comprises instructions executable by said processor whereby said apparatus is operative to:
adjust the subframe timing by increasing the subframe timing difference to a half of a subframe length of the second subframe structure.

10. The apparatus according to claim 7, wherein said memory further comprises instructions executable by said processor whereby said apparatus is operative to:
align the subframe timing of the first wireless communication system and the subframe timing of the second wireless communication system.

11. The apparatus according to claim 7, wherein said memory further comprises instructions executable by said processor whereby said apparatus is operative to:
determine, by the first wireless communication system, the subframe timing of the second wireless communication system based on energy detection or reference signal detection of the second wireless communication system.

12. The apparatus according to claim 7, wherein said memory further comprises instructions executable by said processor whereby said apparatus is operative to:
obtain the subframe timing difference based on a report received from a terminal device served by the first wireless communication system.

13. A non-transitory computer-readable storage medium storing instructions which, when executed on at least one processor, cause the at least one processor to:
monitor a subframe timing of a second wireless communication system operating on a second subframe structure in an unlicensed spectrum;
obtain a subframe timing difference between a first wireless communication system operating on a first subframe structure in the unlicensed spectrum and the second wireless communication system based on the subframe timing of the second wireless communication system;
determine whether unfairness exists between the first and second wireless communication systems based on the subframe timing difference, wherein the unfairness exists between the first and second wireless communication systems to contend for a channel on an unlicensed carrier in the unlicensed spectrum, causing the first wireless communication system to have a probability lower than the second wireless communication system to obtain the channel; and
adjust a subframe timing of the first wireless communication system, in response to the determination of the existence of the unfairness, to improve the probability of the first wireless communication system to obtain the channel on the unlicensed carrier in the unlicensed spectrum for data communication by the first wireless communication system.

* * * * *